United States Patent
Hyodo et al.

(10) Patent No.: US 7,535,144 B2
(45) Date of Patent: May 19, 2009

(54) STRUCTURE FOR RETAINING MAGNETS RELATIVE TO STATOR IN ELECTRIC TOOL

(75) Inventors: Koki Hyodo, Aichi (JP); Kenichi Ohta, Aichi (JP)

(73) Assignee: Makita Corporation, Anjo-shi (JP)

( * ) Notice: Subject to any disclaimer, the term of this patent is extended or adjusted under 35 U.S.C. 154(b) by 0 days.

(21) Appl. No.: 11/585,818

(22) Filed: Oct. 25, 2006

(65) Prior Publication Data

US 2007/0057588 A1 Mar. 15, 2007

(51) Int. Cl.
   *H02K 21/00* (2006.01)
(52) U.S. Cl. .............................. 310/154.08; 310/154.25
(58) Field of Classification Search ............ 310/154.08, 310/154.09, 154.12, 154.21, 154.22, 154.25, 310/50
   See application file for complete search history.

(56) References Cited

U.S. PATENT DOCUMENTS 4,508,988 A * 4/1985 Reiss et al. ............ 310/154.22
4,547,687 A * 10/1985 Arai .............................. 310/58
2005/0188528 A1* 9/2005 Ortt et al. ....................... 29/596
2005/0194854 A1* 9/2005 Agnes et al. ............ 310/154.13

FOREIGN PATENT DOCUMENTS

JP A 2004-80969 3/2004

* cited by examiner

*Primary Examiner*—Renee S Luebke
*Assistant Examiner*—Jason Collins
(74) *Attorney, Agent, or Firm*—Oliff & Berridge, PLC

(57) ABSTRACT

A stator, in which a rotor is rotatably accommodated, is provided with a cylindrical yoke and a magnet that is arranged so as to extend along an inner circumference of the yoke, and has a plurality of magnetic poles generating a magnetic field operable to rotate the rotor. A tip tool is coupled to the rotor and operable to perform a prescribed working in accordance with the rotation of the rotor. The yoke is includes a plurality of steel plates laminated together to form a cylindrical yoke. At least one of a groove and a rib is provided on at least one of the inner circumference of the yoke and an outer circumferential of the magnet so as to extend in an axial direction of the cylindrical yoke. The at least one of the groove and the rib is provided at a boundary between the magnetic poles.

4 Claims, 4 Drawing Sheets

STRUCTURE FOR RETAINING MAGNETS RELATIVE TO STATOR IN ELECTRIC TOOL

BACKGROUND

1. Technical Field

The present invention relates to an electric tool and, more particularly, to a technique for arranging magnets on the inner circumference of a stator yoke in a motor for driving a tip tool.

2. Related Art

In Japanese Patent Publication No. 2004-80969A, there is disclosed a permanent magnet type brush motor in which arcuate magnets are arranged on the inner circumference of the stator yoke. Generally, the magnets are adhered to the inner circumference of the stator yoke by an adhesive, although not clearly described in this publication.

The magnets adhered to the inner circumference of the stator yoke may be peeled therefrom as the adhesive comes out. Especially the motor for the electric tool is so seriously influenced by the vibrations during the working action that the possibility for the magnets to come out is higher than that of the motor used in the stationary environment.

SUMMARY

It is therefore one advantageous aspect of the invention to provide a technique for arranging the magnets reliably on the inner circumference of the stator yoke in the motor of the electric tool.

According to one aspect of the invention, there is provided an electric tool, including: a rotor and a stator, in which the rotor is rotatably accommodated. The stator includes a cylindrical yoke and a magnet the magnet arranged so as to extend along an inner circumference of the yoke and having a plurality of magnetic poles generating a magnetic field operable to rotate the rotor. The electric tool further includes a tip tool, coupled to the rotor and operable to perform a prescribed working in accordance with the rotation of the rotor. The stator further includes at least one of a groove and a rib provided on at least one of the inner circumference of the yoke and an outer circumferential of the magnet so as to extend in an axial direction of the cylindrical yoke, and the at least one of the groove and the rib is provided at a boundary between the magnetic poles.

The yoke may include a plurality of annular steel plates which are laminated one on another in the axial direction. Each of the steel plates may be provided with a coupler arranged at a position opposing either the groove or the rib relative to a radial direction of the cylindrical yoke. The coupler in one of the steel plates may be engaged with the coupler in an adjoining one of the steel plates to couple the steel plates with each other.

One of the main faces of each of the steel plates may be formed with burrs and may face a first one of axial ends of the cylindrical yoke. The yoke may be adapted to accommodate the magnet inserted from a second one of the axial ends opposite to the first one of the axial ends.

The electric tool may further comprise a stopper, provided on at least a part of the inner circumference at one of axial ends of the cylindrical yoke, and is adapted to come in contact with the magnet in the axial direction.

BRIEF DESCRIPTION OF THE DRAWINGS

These and other aspects and advantages of the present invention will be described in detail with reference to the accompanying drawings.

DETAILED DESCRIPTION OF EXEMPLARY EMBODIMENTS

Exemplary embodiments of the invention will be described below in detail with reference to the accompanying drawings.

As a first embodiment, an impact driver 100 of electric type (or charging type) is described as one example of an electric tool.

Figure 1:
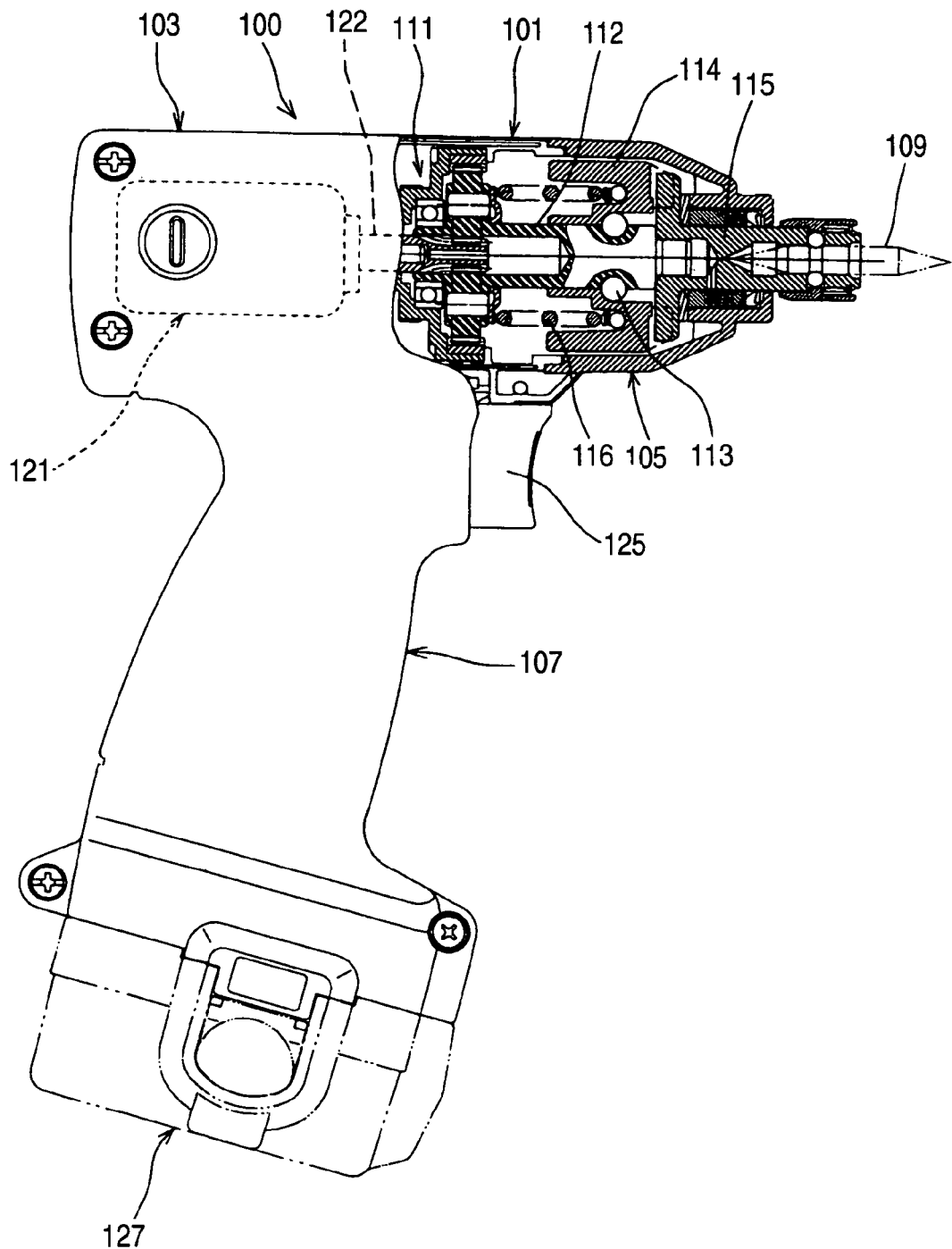
FIG. 1 is a partial section view of an impact driver according to a first embodiment of the invention.

As shown in FIG. 1, the impact driver 100 includes a body unit 101 forming a casing of the impact driver 100, and a driver bit 109 serving as a tip tool is removably fitted in the front end part of the body unit 101 for fastening various screws.

The body unit 101 is constituted to include a motor housing 103, a gear housing 105 and a handgrip 107. A motor 121 is accommodated in the motor housing 103. The handgrip 107 is equipped with a trigger 125, which is operative to activate the motor 121.

In the gear housing 105, there are arranged a reduction gear mechanism 111 having a planetary gear mechanism for properly reducing the speed of a rotary shaft 122 of the motor 121, a spindle 112 adapted to be rotationally driven by the reduction gear mechanism 111, a hammer 114 adapted to be rotationally driven by the spindle 112 through balls 113 serving as a transmission member, and an anvil 115 adapted to be rotationally driven by the hammer 114. This hammer 114 can be relatively moved in the longitudinal direction of the spindle 122 and is biased toward the anvil 115 by a compressed coil spring 116. Here, the front end of the anvil 115 protrudes from the front end of the gear housing 105, and the driver bit 109 is removably attached to the protruded front end of the anvil 115.

When the motor 121 is activated for the screw fastening operation and while the fastening torque by the driver bit 109 is under a light load, the spindle 112 and the hammer 114 rotate together. In this light load state, the hammer 114 is held to engage with the anvil 115 by the biasing force of the compressed coil spring 116. As a result, the anvil 115 rotates together with the hammer 114 so that the screw fastening operation by the driver bit 109 is performed.

When the fastening torque increases to a predetermined load, the hammer 114 retracts against the compressed coil spring 116 in the direction apart from the anvil 115, and is then brought into engagement, while being accompanied by an impacting rotational torque, with the anvil 115 thereby to establish a high fastening torque in the driver bit 109 through the anvil 115. Here, the working principle itself of the impact driver itself is well known in the art, and the description of its detailed constitution and operation is omitted.

Figure 2:
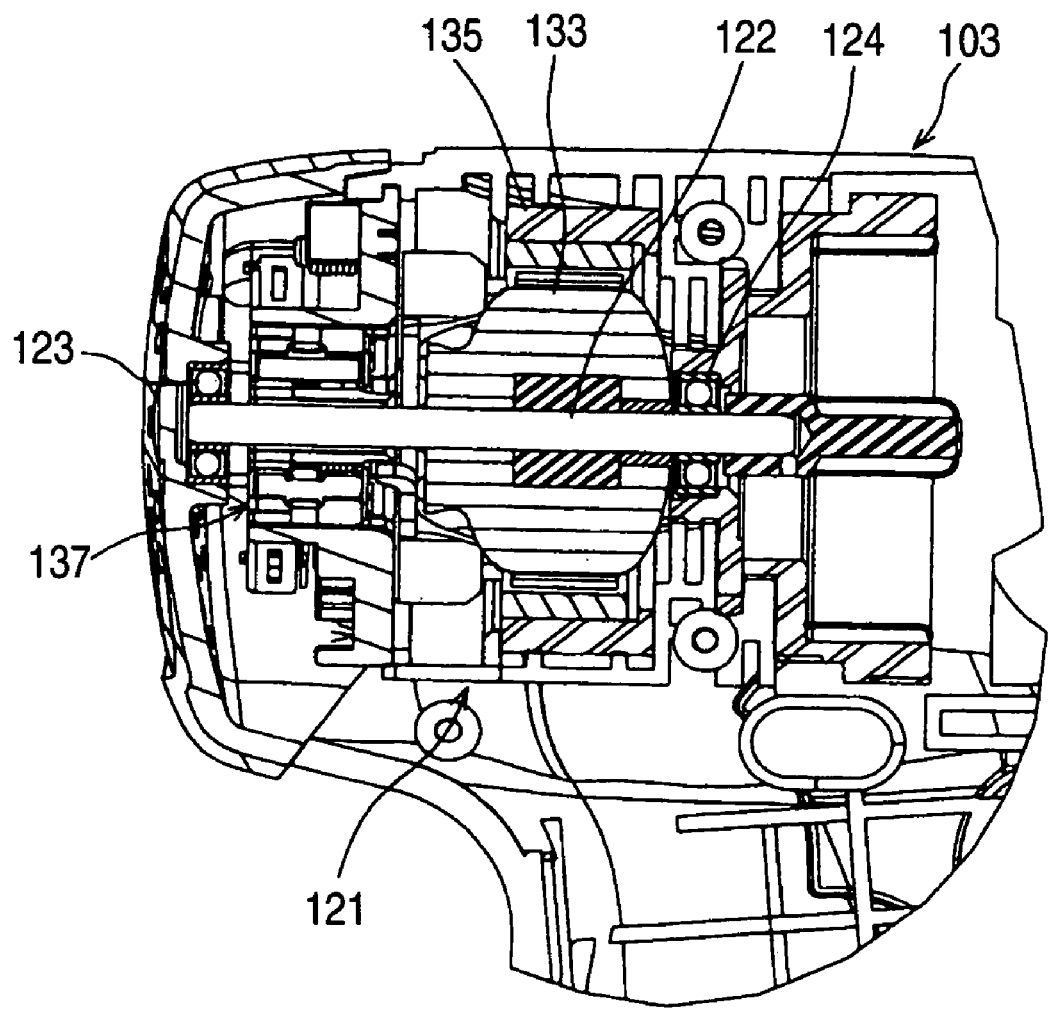
FIG. 2 is an enlarged section view of a rear part of the impact driver.

Next, the constitution of the motor 121 is described with reference to FIG. 2. The motor 121 of this embodiment is exemplified by a quadrupolar DC motor using a battery 127 (also referred to FIG. 1) as a driving power source. The motor 121 is constituted to include: the rotary shaft 122; an armature 133 being rotatable integrally with the rotary shaft 122 and wound with a coil forming the winding of the armature; a stator 135 fixed in the motor housing 103 for generating a magnetic field around the armature 133; a commutator 137 disposed on one end side (or on the opposite side of the reduction gear mechanism 111) of the rotary shaft 122; and a brush (although not especially shown) in sliding contact with a plurality of segments disposed in the outer circumference of the commutator 137, to feed the drive current to the armature winding arranged on the armature 133.

The rotary shaft 122 is rotatably supported at one end (the left side in FIG. 2) by the motor housing 103 through a bearing 123 and at the other end closer to the reduction gear mechanism 111 (the right side in FIG. 2) by the gear housing 105 through a bearing 124. Here, the rotary shaft 122, the armature 133 and the commutator 137 constitute a rotor.

When the motor 121 is activated, the drive current is fed to the winding of the armature 133 in the magnetic field of the stator 135, so that the armature 133 and the rotary shaft 122 are rotationally driven together. At this time, the direction of the electric current to flow in the armature winding is properly changed by the commutator 137 and the brush so that the armature 133 and the rotary shaft 122 are continuously rotated in the predetermined direction. Here, the working principle itself of the DC motor belongs to the well-known technical matter so that the description its detailed constitution and action is conveniently omitted.

Figure 3:
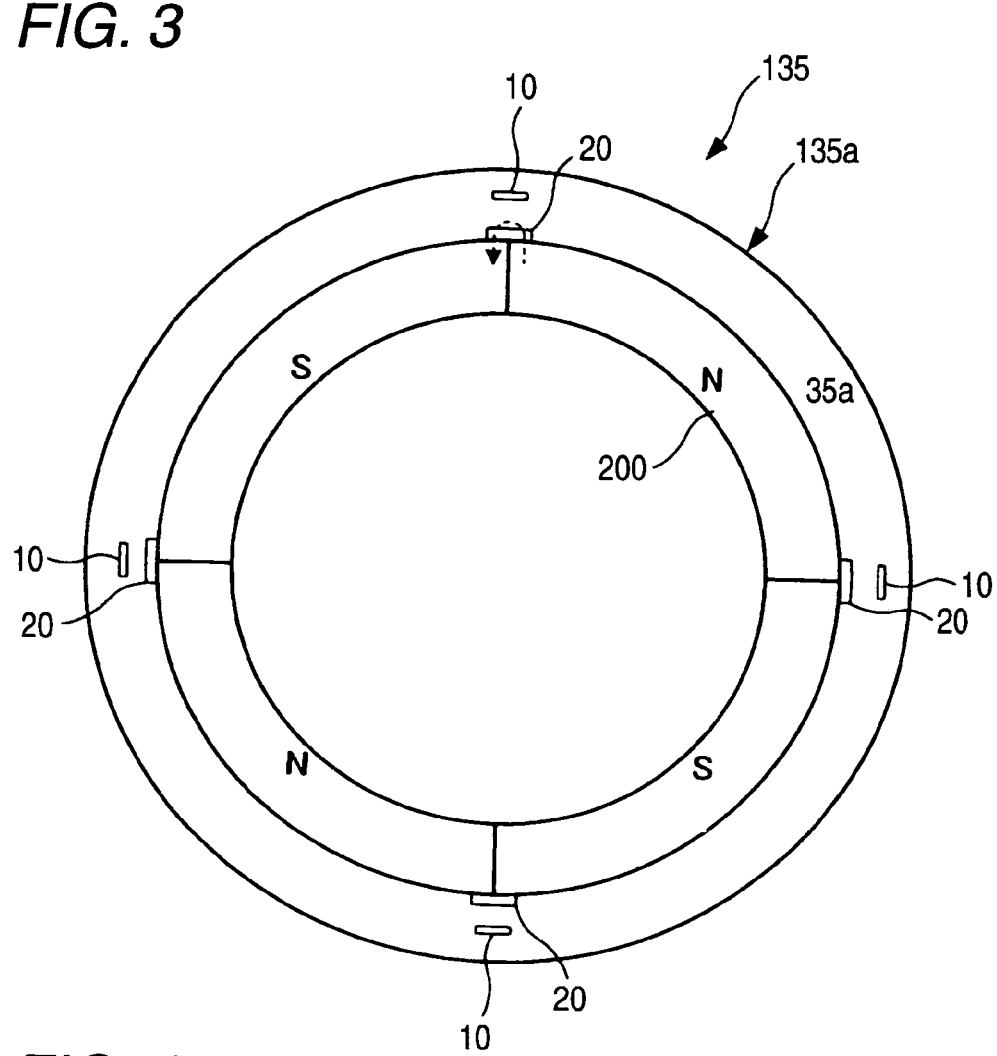
FIG. 3 is a plan view showing a stator yoke of a motor in the impact driver.

Next, the detailed constitution of the stator 135 of the motor 121 is described with reference to FIG. 3.

The stator 135 is equipped with a cylindrical stator yoke 135*a* and magnets 200. These magnets 200 are arranged circumferentially on the inner circumference of the stator yoke 135*a* thereby to establish the magnetic field.

The stator yoke 135*a* is constituted by laminating thin steel plates 35*a* in the axial direction of the stator yoke 135*a*. The individual steel plates 35*a* are punched out generally into a ring shape by a press. Couplers 10 are formed at four positions with a constant angular interval (i.e., 90 degrees) in the circumferential direction of the general ring shape. The couplers 10 are recessed in the thickness direction of the steel plates (that is, the axial direction of the stator yoke 135*a*). At the time when the steel plates 35*a* are laminated one on the other, the coupler 10 protruded from the back face of one steel plate 35*a* is fitted into the coupler 10 recessed on the front face of an adjoining steel plate 35*a*.

In the steel plate 35*a*, a notch 20 is formed in the inner circumference at a position adjacent to each of the couplers 10. Supposing a case where the steel plate 35*a* has an external diameter of 44 mm and an internal diameter of 37 mm, the notch 20 is formed to have a dimension of 0.1 mm in the radial direction of the stator yoke 135*a* and a dimension of 3.5 mm in the circumferential direction of the stator yoke 135*a*.

The cylindrical stator yoke 135*a* is formed by laminating the steel plates 35*a* and fixing one on another with the couplers 10, and then punching the steel plates 35*a* into a prescribed shape. As a result, the notches 20 formed in the individual steel plates 35*a* continue to form four grooves in the inner circumference of the stator yoke 135*a* and in the axial direction of the stator yoke 135*a*.

Moreover, the magnets 200 are exemplified by a ring magnet having an axial length equivalent to that of the stator yoke 135*a*.

The ring magnet is press-fitted, in the state of an unmagnetized precursor 210, in the stator yoke 135*a*. An adhesive is applied to the inner circumference of the stator yoke 135*a*. Therefore, the precursor 210 is adhered and fixed to the inner circumference by the adhesive. When the load to press-fit the precursor 210 in the stator yoke 135*a* is so low that the precursor 210 is hardly fixed on the inner circumference of the stator yoke 135*a*, the adhesive is additionally poured into the notches 20 of the stator yoke 135*a* thereby to ensure the fixing operation.

Moreover, the precursor 210 is divided into four sections such that each boundary between the adjacent sections opposes one of the notches 20, and diagonally opposing two sections are magnetized to the same polarity (i.e., the N pole or the S pole), thereby to prepare the magnets 200.

The notches 20 can be used as adhesive reservoirs for the adhesive to adhere the outer circumference of the precursor 210 and the inner circumference of the stator yoke 135*a*. When the adhesive is short although the precursor 210 is inserted into the stator yoke 135*a*, the precursor 210 can be reliably adhered in the inner circumference of the stator yoke 135*a* by pouring the adhesive additionally into the notches 20. Therefore, the precursor 210 can be reliably arranged in the inner circumference of the stator yoke 135*a*.

When the precursor 210 is inserted into the stator yoke 135*a*, moreover, the excess adhesive can be received by the notches 20. This makes it hard for the adhesive to come out of the precursor 210.

Since the notches 20 are formed in the inner circumference at the positions where the couplers 10 of the steel plates 35*a* are formed, the inner circumference of a stator yoke 135*a* is hard to bulge even by caulking the steel plates 35*a* mutually. This makes it easy to insert and arrange the precursor 210 in the stator yoke 135*a*.

Of the magnetic fluxes generated by the magnet 200, generally speaking, the magnetic flux, in which the magnetic circuit passes through the armature arranged inside of the stator, is called the main magnetic flux, which is used to drive the armature, that is, to rotate the rotor. In a case where the different poles of the magnets exist adjacent to each other, however, the short-circuited magnetic fluxes, in which the magnetic circuit does not pass through the armature, may occur at the boundary between the different poles of the magnets.

Since the notches 20 are formed in the boundaries between the sections of the magnets 200 having different magnetic poles, generation of the magnetic fluxes (as indicated by a dashed arrow in FIG. 3) connecting the adjacent sections of the magnets 200 (that is, the magnetic circuit does not pass through the armature 133) can be prevented. This makes it possible to reduce the magnetic loss of the magnets 200.

In this embodiment, the notches 20 are formed in the groove shape at the four portions of the inner circumference of the stator yoke 135*a*. However, the number and shape of the notches 20 and the positions of the circumferential arrangement of the notches 20 may be changed.

In this embodiment, all of the steel plates 35*a* are formed with the notches 20 so that the grooves formed by the notches 20 extend so as to connect both ends of the stator yoke 135*a* in the axial direction thereof. However, there may be provided steel plates not formed with the notches, so that the grooves are partly formed on the stator yoke 135*a* relative to the axial direction thereof.

Figure 4:
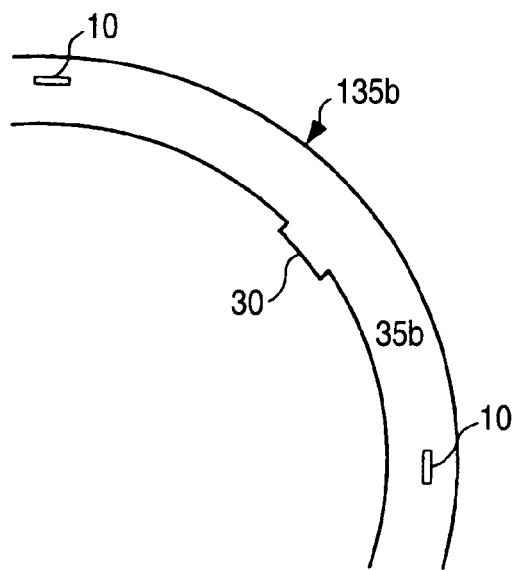
FIG. 4 is a plan view showing a stator yoke of a motor in an impact driver according to a second embodiment of the invention.

Next, a second embodiment of the invention will be described with reference to FIG. 4. In this embodiment, a projection 30 is formed on an inner circumference of each of steel plates 35*b* forming the stator yoke 135*b*. Supposing a case where the steel plates 35*b* have an external diameter of 44 mm and an internal diameter of 37 mm, the projection 30 has a dimension of 0.1 mm in the radial direction of the stator yoke 135b, and a dimension of 3 mm in the circumferential direction of the stator yoke 135b. The steel plates 35b thus punched are laminated one on another thereby to form the cylindrical stator yoke 135b. As a result, the projections 30, as formed on the individual steel plates 35b, are made continuous to form a rib on the inner circumference of the stator yoke 135b so as to extend in the axial direction of the stator yoke 135b.

The stator yoke 135b, as formed by laminating the steel plates 35b, has a higher hardness than that of the precursor 210. When the precursor 210 having an external diameter substantially equal to the internal diameter of the stator yoke 135b is press-fitted into the stator yoke 135b, the precursor 210 is arranged, while its outer circumference being scraped by the projections 30, in the inner circumference of the stator yoke 135b.

With the above configuration, the projections 30 obstruct the circumferential rotations of the precursor 210 when the precursor 210 is arranged in the inner circumference of the stator yoke 135b. This obstruction can prevent the circumferential deviation between the magnets 200 and the stator yoke 135b. Therefore, the precursor 210 can be reliably arranged in the inner circumference of the stator yoke 135b.

Here, the number, the shape and the circumferential position of the projections 30 may be changed.

In this embodiment, all of the steel plates 35a are formed with the projections 30 so that the rib formed by the projections 30 extend so as to connect both ends of the stator yoke 135a in the axial direction thereof. However, there may be provided steel plates not formed with the projection, so that the rib is partly formed on the stator yoke 135a relative to the axial direction thereof.

Figure 5:
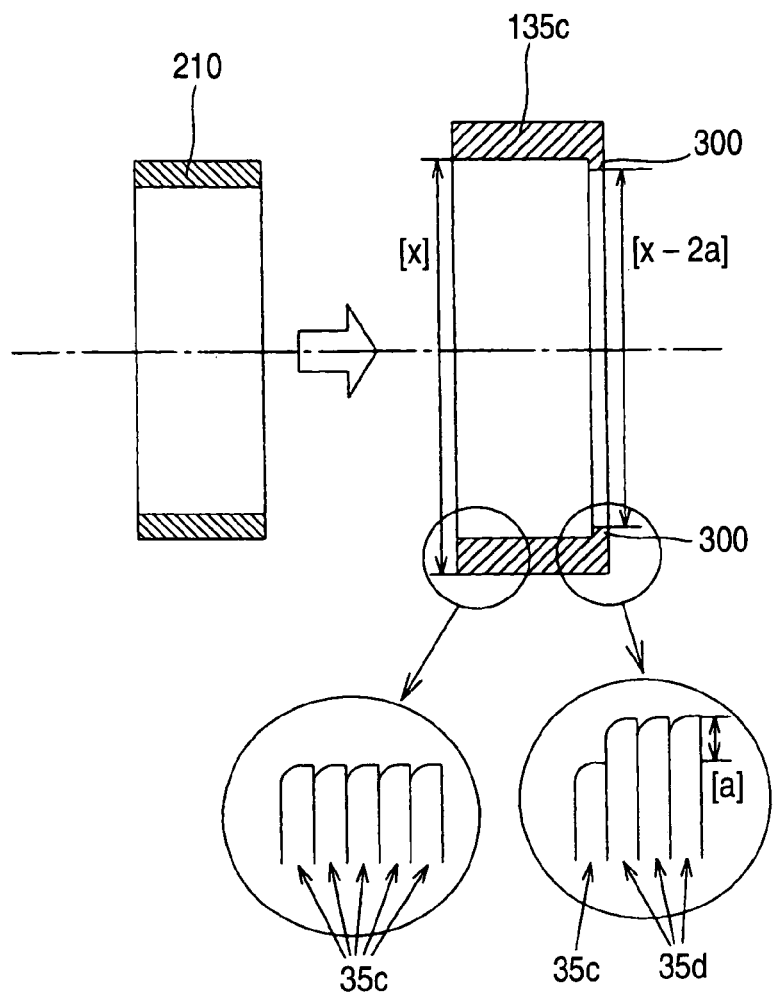
FIG. 5 is a schematic section view showing how to fabricate a stator of a motor in an impact driver according to a third embodiment of the invention.

Next, a third embodiment of the invention will be described with reference to FIG. 5. In this embodiment, a stator yoke 135c is provided with not only at least one of the notches 20 as described in the first embodiment and the projections 30 as described in the second embodiment, but also a stopper 300, which is on the opposite side (the right side in FIG. 5) in the axial direction to the side, on which the precursor 210 is to be inserted.

Steel plates 35c for forming the stator yoke 135c of this embodiment are prepared by laminating the steel plates 35c having an internal diameter "x" on the portion not having the stopper 300. Moreover, steel plates 35d having an internal diameter of "x-2a" are laminated at the portion, as equipped with the stopper 300. As a result, the stopper 300 having a height "a", as protrudes radially inward of the stator yoke 135c from the inner circumference, is formed on one end side (the right side in FIG. 5) of the stator yoke 135c. Supposing a case where the steel plates 35a have an external diameter of 44 mm and an internal diameter of 37 mm, the height "a" is set to about 1 mm.

Here, the steel plates 35c and the steel plates 35d are burred at their side faced downward when they were punched because they were slightly crushed in the thickness direction thereof due to the press working. As is enlargedly shown in FIG. 5, the steel plates 35c are so laminated that the sides formed with burrs are faced in the same direction (the right side in FIG. 5).

Into this stator yoke 135c thus constituted, the precursor 210 is inserted from the side (the left side in FIG. 5) that the stopper 300 is not provided (i.e., the side in which the burrs are not formed), as indicated by a thick arrow. Then, the precursor 210 is fixed in the stator yoke 135c.

With the above configuration, the precursor 210 can be easily inserted into the stator yoke 135c. On the other hand, the precursor 210 is prevented from being come out because the burrs on the individual steel plates obstruct the movement of the precursor 210 toward the inlet. Therefore, the assembling workability can be improved.

Moreover, the adhesive for adhering the magnets 200 and the stator yoke 135c can be prevented from dropping by the stopper 300. Further, since the stopper 300 prevents the magnetic flux of the magnets 200 from leaking in the axial direction of the stator yoke 135c, the magnetic flux can be effectively used.

In this embodiment, the stopper 300 is formed entirely over the inner circumference of the stator yoke 135c. However, the stopper 300 may be formed partially over the inner circumference of the stator yoke 135c. Alternatively, the stopper 300 may be bar-shaped connecting different portions of the inner circumference of the stator yoke 135c.

In the first embodiment, the notches are formed on the discrete positions of the inner circumference of the stator yoke. In the second embodiment, the protrusions are formed on the inner circumference of the stator yoke. The inner circumference of the stator yoke may be provided with both of the notches and the protrusions. Further, the notches and the protrusions may not be located at discrete circumferential positions.

Figure 6:
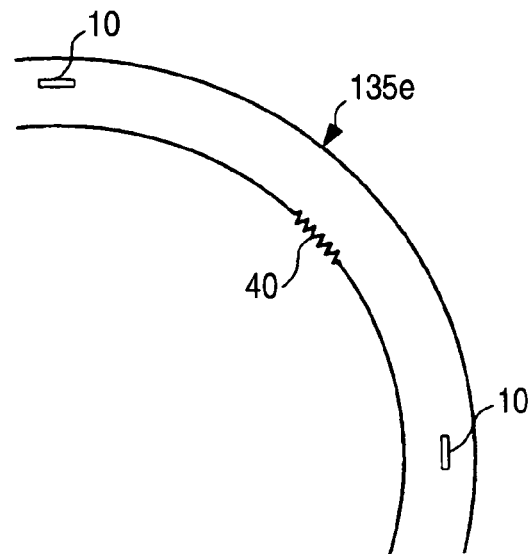
FIG. 6 is a partial plan view showing a stator yoke of a motor in an impact driver according to a fourth embodiment of the invention.

Next, an example of such a configuration will be described as a fourth embodiment of the invention with reference to FIG. 6. In this embodiment, the notches 20 and the projections 30 are alternately and continuously formed so as to be saw-shaped as illustrutated by the saw-shaped notch 40. With this configuration, both of the advantage obtained by the first embodiment and the advantage obtained by the second embodiment can be attained.

In the above embodiments, the magnet 200 is arranged on the inner circumference of the stator yoke 135a. However, the magnet may be arranged on the outer circumference of the stator yoke.

In the above embodiments, the notches 20 and the projections 30 are formed on the stator yoke. However, the notches and the projections may be formed on at least one of the magnet and the stator yoke.

In the above embodiment, the impact driver 100 is exemplified as the electric tool. However, the invention can be applicable to another electric tool.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

The disclosure of Japanese Patent Application No. 2004-321192 filed Nov. 4, 2004 including specification, drawings and claims is incorporated herein by reference in its entirety.

What is claimed is:

1. An electric tool, comprising:
   a rotor;
   a stator, in which the rotor is rotatably accommodated, comprising:
      a cylindrical yoke with a continuous circumference; and
      a cylindrical magnet with a continuous circumference, arranged so as to extend along an inner circumference of the yoke, and having a plurality of magnetic poles generating a magnetic field operable to rotate the rotor; and
   a tip tool, coupled to the rotor and operable to perform a prescribed working in accordance with the rotation of the rotor;

wherein:
- at least one of a groove and a rib is provided on at least one of the inner circumference of the yoke and an outer circumferential circumference of the magnet so as to extend in an axial direction of the cylindrical yoke; and
- at least one of the groove and the rib is provided at a boundary between the magnetic poles.

2. The electric tool as set forth in claim 1, wherein:
the yoke includes a plurality of annular steel plates which are laminated one on another in the axial direction;
each of the steel plates is provided with a coupler arranged at a position opposing either the groove or the rib relative to a radial direction of the cylindrical yoke; and
the coupler in one of the steel plates is engaged with the coupler in an adjoining one of the steel plates to couple the steel plates with each other.

3. The electric tool as set forth in claim 2, wherein:
one of the main faces of each of the steel plates is formed with burrs and faces a first one of axial ends of the cylindrical yoke; and
the yoke is adapted to accommodate the magnet inserted from a second one of the axial ends opposite to the first one of the axial ends.

4. The electric tool as set forth in claim 1, further comprising:
a stopper, provided on at least a part of the inner circumference at one of axial ends of the cylindrical yoke, and is adapted to come in contact with the magnet in the axial direction.

* * * * *